United States Patent
Kreth et al.

(10) Patent No.: US 11,593,812 B2
(45) Date of Patent: *Feb. 28, 2023

(54) NEURAL NETWORK HOST PLATFORM FOR GENERATING AUTOMATED SUSPICIOUS ACTIVITY REPORTS USING MACHINE LEARNING

(71) Applicant: Bank of America Corporation, Charlotte, NC (US)

(72) Inventors: Kyle Kreth, Charlotte, NC (US); Andrew Vlasic, Charlotte, NC (US); Selvakumar Albert, Charlotte, NC (US); Jeremiah Thompson, Charlotte, NC (US); Nancy T. Carrier, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,855

(22) Filed: Oct. 4, 2021

(65) Prior Publication Data
US 2022/0027920 A1 Jan. 27, 2022

Related U.S. Application Data

(63) Continuation of application No. 16/890,175, filed on Jun. 2, 2020, now Pat. No. 11,176,557.
(Continued)

(51) Int. Cl.
*G06Q 20/40* (2012.01)
*G06Q 40/02* (2012.01)
(Continued)

(52) U.S. Cl.
CPC ....... *G06Q 20/4016* (2013.01); *G06F 16/219* (2019.01); *G06N 3/04* (2013.01);
(Continued)

(58) Field of Classification Search
CPC .............. G06Q 20/4016; G06Q 10/10; G06Q 30/0185; G06Q 20/10; G06Q 50/26; G06Q 40/02; G06F 12/219; H03M 7/3059
(Continued)

(56) References Cited

U.S. PATENT DOCUMENTS

| 8,145,585 B2 | 3/2012 | Najarian et al. |
| 8,762,191 B2 | 6/2014 | Lawrence et al. |

(Continued)

OTHER PUBLICATIONS

Yushi Chen et al. "Deep Feature Extraction and Classification of Hyperspectral Images Based on Convolutional Neural Networks" IEEE Transactions on Geoscience and Remote Sensing vol. 54, Issue: 10, Jul. 18, 2016, pp. 1-20.
(Continued)

*Primary Examiner* — Lindsay M Maguire
(74) *Attorney, Agent, or Firm* — Banner & Witcoff, Ltd.

(57) ABSTRACT

Aspects of the disclosure relate to using machine learning techniques for generating automated suspicious activity reports (SAR). A computing platform may generate a labelled transaction history dataset by combining historical transaction data with historical report information. The computing platform may train a convolutional neural network using the labelled transaction history dataset. The computing platform may receive new transaction data and compress the new transaction data using lossy compression. The computing platform may input the compressed transaction data into the convolutional neural network, which may cause the convolutional neural network to output a suspicious event probability score based on the compressed transaction data. The computing platform may determine whether the suspicious event probability score exceeds a predetermined threshold and, if so, the computing platform may send one or more commands directing a report pro-
(Continued)

cessing system to generate a SAR, which may cause the report processing system to generate the SAR.

20 Claims, 12 Drawing Sheets

Related U.S. Application Data

(60) Provisional application No. 62/991,625, filed on Mar. 19, 2020.

(51) Int. Cl.
| | |
|---|---|
| *G06Q 10/10* | (2012.01) |
| *G06Q 30/00* | (2012.01) |
| *H03M 7/30* | (2006.01) |
| *G06Q 50/26* | (2012.01) |
| *G06F 16/21* | (2019.01) |
| *G06N 3/04* | (2006.01) |
| *G06N 3/08* | (2006.01) |
| *G06Q 50/00* | (2012.01) |
| *G06Q 30/018* | (2023.01) |

(52) U.S. Cl.
CPC ............... *G06N 3/08* (2013.01); *G06Q 10/10* (2013.01); *G06Q 30/0185* (2013.01); *G06Q 40/02* (2013.01); *G06Q 50/01* (2013.01); *G06Q 50/26* (2013.01); *H03M 7/3059* (2013.01)

(58) Field of Classification Search
USPC .......................................................... 705/35
See application file for complete search history.

(56) References Cited

U.S. PATENT DOCUMENTS

| | | |
|---|---|---|
| 8,996,481 B2 | 3/2015 | Lawrence et al. |
| 9,058,581 B2 | 6/2015 | Lawrence et al. |
| 9,063,985 B2 | 6/2015 | Lawrence et al. |
| 9,330,416 B1 | 5/2016 | Zaslavsky et al. |
| 9,407,509 B2 | 8/2016 | Porras et al. |
| 9,594,907 B2 | 3/2017 | Duke et al. |
| 10,037,541 B1 | 7/2018 | Dangott et al. |
| 10,157,226 B1 | 12/2018 | Costabello et al. |
| 10,163,158 B2 | 12/2018 | Song et al. |
| 10,339,526 B2 | 7/2019 | Locasto et al. |
| 10,346,410 B2 | 7/2019 | Saperstein et al. |
| 10,402,824 B2 | 9/2019 | Michelsen et al. |
| 10,437,840 B1 | 10/2019 | Poh et al. |
| 10,438,297 B2 | 10/2019 | Han et al. |
| 10,565,592 B2 | 2/2020 | Enzaldo et al. |
| 10,963,786 B1 | 3/2021 | Taylor et al. |
| 2018/0063538 A1 | 3/2018 | Bernal et al. |
| 2018/0365773 A1 | 12/2018 | Han et al. |
| 2019/0122258 A1 | 4/2019 | Bramberger et al. |
| 2019/0266528 A1 | 8/2019 | Cheng et al. |
| 2019/0378051 A1 | 12/2019 | Widmann et al. |

OTHER PUBLICATIONS

"Lossy compression" Wikipedia https://en.wikipedia.org/wiki/Lossy_compression website visited May 4, 2020, pp. 1-7.

"Suspicious activity report" Wikipedia https://en.wikipedia.org/wiki/Suspicious_activity_report website visited May 4, 2020, pp. 1-4.

Kingma, Diederik P., and Max Welling. "Stochastic gradient VB and the variational auto-encoder." Second International Conference on Learning Representations, ICLR. vol. 19. 2014.

Qiao, Mengyu, Andrew H. Sung, and Qingzhong Liu. "Revealing real quality of double compressed MP3 audio." Proceedings of the 18th ACM international conference on Multimedia. ACM, 2010.

Peemen, Maurice, et al. "Memory-centric accelerator design for convolutional neural networks." 2013 IEEE 31st International Conference on Computer Design (ICCD). IEEE, 2013.

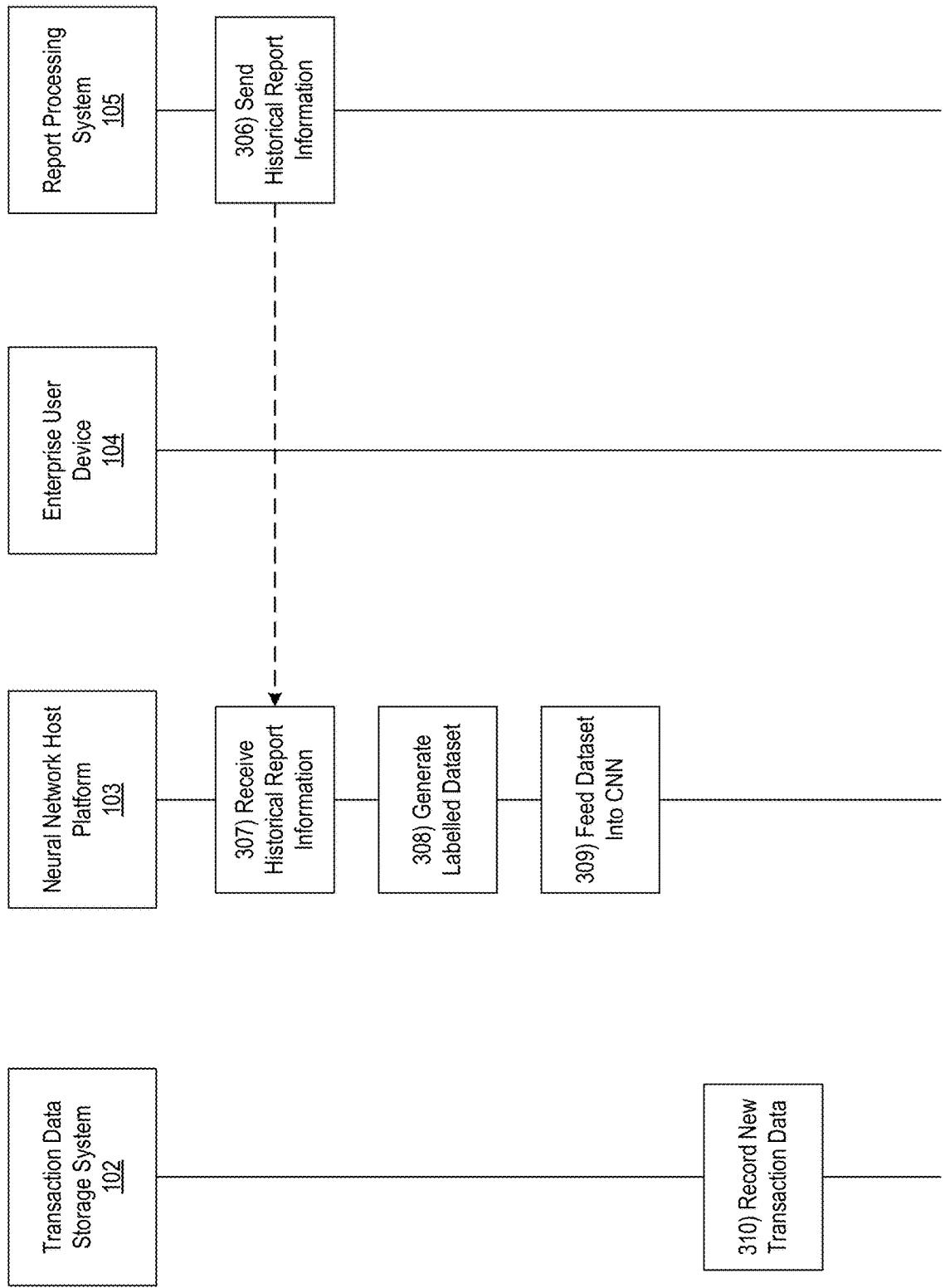

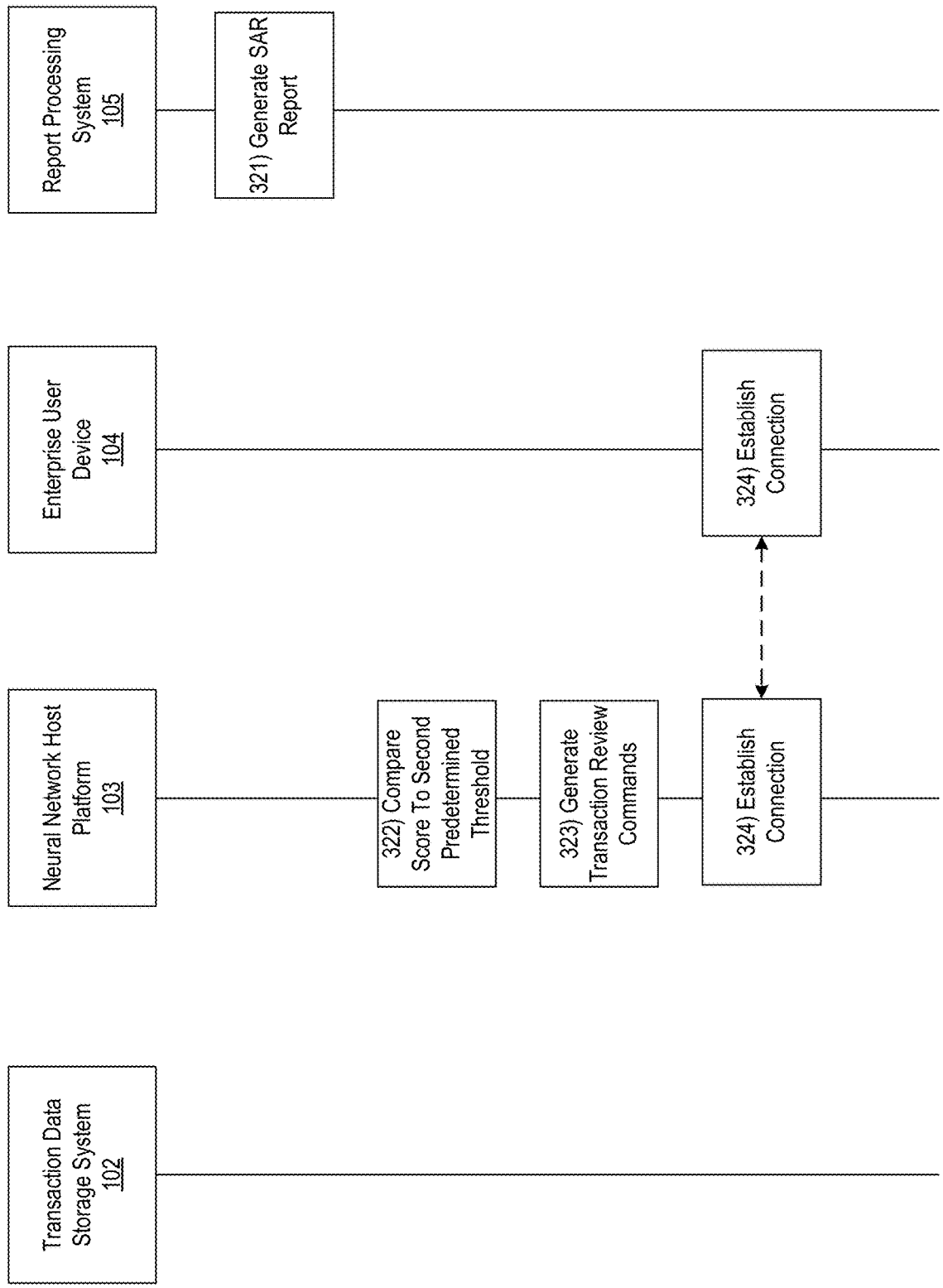

505

Transaction Review Interface

Transaction #1 has been flagged for manual review. Please review the indicate whether a suspicious activity report should be generated.

Generate Report             No Report Needed

FIG. 5

NEURAL NETWORK HOST PLATFORM FOR GENERATING AUTOMATED SUSPICIOUS ACTIVITY REPORTS USING MACHINE LEARNING

CROSS-REFERENCE TO RELATED APPLICATIONS

This application claims the benefit of and priority to U.S. Continuation application Ser. No. 16/890,175, which was filed Jun. 2, 2020 and which claims the benefit of and priority to U.S. Provisional Patent Application Ser. No. 62/991,625, which was filed on Mar. 19, 2020, and entitled "Neural Network Host Platform for Generating Automated Suspicious Activity Reports Using Machine Learning," and which is incorporated by reference herein in its entirety.

BACKGROUND

Aspects of the disclosure relate to data processing systems, machine learning, and event monitoring and reporting. In particular, one or more aspects of the disclosure relate to computing platforms that implement machine learning methods to monitor activity and automatically generate suspicious activity reports.

In some cases, an enterprise organization may record data corresponding to a transaction history across a plurality of channels, each offered as an individual service. To avoid difficulties with analysis of many variables, features, or the like corresponding to this plurality of channels, this data may be approximated at an aggregate level for analysis. This approximation may result in an error prone analysis of the transaction history data. As a result, it may be difficult for enterprise organizations to leverage historical transaction data as a robust information source for identification of suspicious activity.

SUMMARY

Aspects of the disclosure provide effective, efficient, scalable, and convenient technical solutions that address and overcome the technical problems associated with monitoring activity and generating suspicious activity reports. For example, some aspects of the disclosure provide techniques that may enable computing devices to compress transaction data using one or more lossy compression techniques for analysis by a convolutional neural network to identify whether or not the transaction data corresponds to a suspicious activity, and to direct a report processing system to generate the report accordingly. In doing so, various technical advantages may be realized. For example, one technical advantage of applying lossy compression and machine learning to transaction data is that it allows the transaction data to be analyzed in its entirety, rather than using aggregate level approximations of the transaction data. In doing so, error rates (e.g., false positive and/or false negative identifications) may be significantly reduced. Furthermore, by compressing the transaction data using vectorization, the transaction data may be enriched with data from other sources that may be formatted in a different manner. This may allow further information to be included in the suspicious activity analysis to further reduce errors rates. As yet an additional advantage, by reducing false positive identifications and/or automatically generating reports, investigator efficiency (e.g., with regard to transaction review and report generation) may be increased and unnecessary cost (e.g., to fund review of false positive cases) may be minimized or eliminated.

In accordance with one or more embodiments of the disclosure, a computing platform comprising at least one processor, a communication interface, and memory storing computer-readable instructions may generate a labelled transaction history dataset by combining historical transaction data with historical report information. The computing platform may train a convolutional neural network using the labelled transaction history dataset. The computing platform may receive new transaction data. The computing platform may compress the new transaction data using at least one lossy compression method, which may produce compressed transaction data. The computing platform may input the compressed transaction data into the convolutional neural network, which may cause the convolutional neural network to output a suspicious event probability score based on the compressed transaction data. The computing platform may determine whether the suspicious event probability score exceeds a first predetermined threshold. Based on determining that the suspicious event probability score exceeds the first predetermined threshold, the computing platform may send one or more commands to a report processing system directing the report processing system to generate a suspicious activity report (SAR), which may cause the report processing system to generate the SAR.

In one or more instances, the historical transaction data may be one or more of: deposit amounts, frequency of deposits, identities of depositors, identities of individuals related to the depositors, location of deposits, account information, locations of institutions corresponding to the account information, wire transfer frequency corresponding to a plurality of historical transactions, or the like. In one or more instances, the historical report information may indicate whether or not a suspicious activity report (SAR) was generated based on the historical transaction data.

In one or more instances, the new transaction data may be one or more of: deposit amounts, frequency of deposits, identities of depositors, identities of individuals related to the depositors, location of deposits, account information, locations of institutions corresponding to the account information, wire transfer frequency corresponding to a plurality of new transactions, or the like, and the new transaction data may be generated after the historical transaction data. In one or more instances, the computing platform may compress the new transaction data using the at least one lossy compression method by feeding the new transaction data into an auto encoder. In these instances, the auto encoder may: 1) generate one or more vector representations of the new transaction data, 2) compute, using the one or more vector representations of the new transaction data, a mean value and a standard deviation representative of the one or more vector representations of the new transaction data, 3) sample, in a random manner, the one or more vector representations of the new transaction data, 4) compute, using the sampled one or more vector representations of the new transaction data, a mean value and a standard deviation representative of the sampled one or more vector representations of the new transaction data, 5) determine whether a first difference between the mean value of the sampled one or more vector representations of the new transaction data and the mean value of the one or more vector representations of the new transaction data exceeds a first predetermined difference threshold and whether a second difference between the standard deviation of the sampled one or more vector representations of the new transaction data and the standard deviation of the one or more vector representations of the new transaction data exceeds a second predetermined difference threshold, and 6) based on a determination that both: a) the first difference does not exceed the first predetermined difference threshold, and b) the second difference does not exceeds the second predetermined difference threshold, output the compressed transaction data.

In one or more instances, the auto encoder may be further configured to: based on a determination that one or more of: a) the first difference does exceeds the first predetermined difference threshold, or b) the second difference exceeds the second predetermined difference threshold: 1) integrate additional data from the one or more vector representations of the new transaction data into the sampled one or more vector representations of the new transaction data, 2) re-compute the mean value and the standard deviation representative of the sampled one or more vector representations of the new transaction data, and 3) determine whether the first difference between the mean value of the sampled one or more vector representations of the new transaction data and the mean value of the one or more vector representations of the new transaction data exceeds the first predetermined difference threshold and whether the second difference between the standard deviation of the sampled one or more vector representations of the new transaction data and the standard deviation of the one or more vector representations of the new transaction data exceeds a second predetermined difference threshold. In one or more instances, the auto encoder may be a variational auto encoder.

In one or more instances, prior to inputting the compressed transaction data into the convolutional neural network, the computing platform may enrich the compressed transaction data by: 1) receiving customer profile data corresponding to the new transaction data, 2) compressing the customer profile data using the at least one lossy compression method, and 3) combining the compressed customer profile data with the compressed transaction data. In one or more instances, enriching the compressed transaction data may result in a multi-dimensional vector input for the convolutional neural network.

In one or more instances, the customer profile data may be one or more of: account information, contact information, social media information, law enforcement requests, or the like. In one or more instances, based on determining that the suspicious event probability score does not exceed the first predetermined threshold, the computing platform may compare the suspicious event probability score to a second predetermined threshold. Based on determining that the suspicious event probability score exceeds the second predetermined threshold, the computing platform may send one or more commands directing an enterprise user device to display a transaction review interface, which may cause the enterprise user device to display the transaction review interface. Based on determining that the suspicious event probability score does not exceed the second predetermined threshold, the computing platform may determine that the new transaction data does not correspond to a suspicious event.

In one or more instances, after determining whether or not the new transaction data corresponds to a suspicious event, the computing platform may update the convolutional neural network to include additional labelled data representative of the new transaction data and whether or not a suspicious event was determined. In one or more instances, the suspicious event may be one or more of: money laundering, wire fraud, a large cash deposit, funneling, or the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3G depict an illustrative event sequence for implementing machine learning techniques for generating automated suspicious activity reports in accordance with one or more example embodiments;

FIG. 5 depicts an illustrative graphical user interface for implementing machine learning techniques for generating automated suspicious activity reports in accordance with one or more example embodiments.

DETAILED DESCRIPTION

Figure 1A:
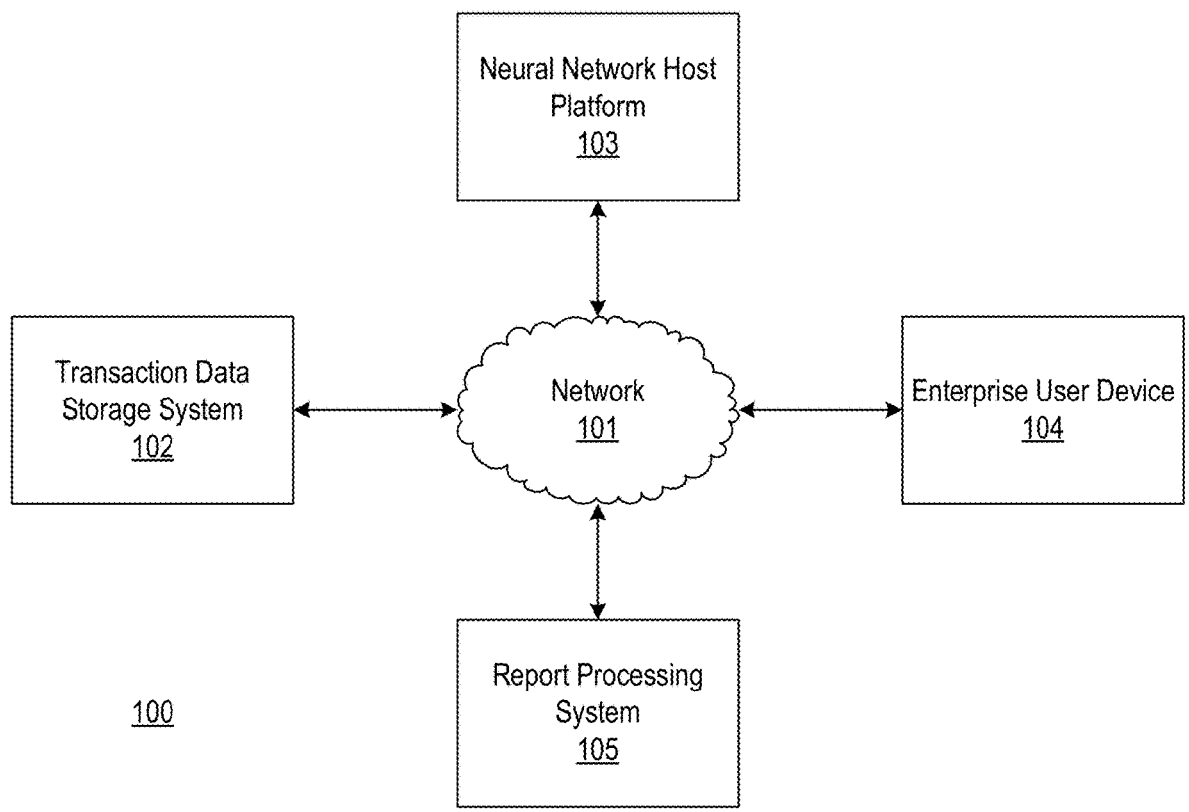
FIGS. 1A-1B depict an illustrative computing environment for implementing machine learning techniques for generating automated suspicious activity reports in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more of the systems and methods herein describe using data from different sources in various data formats to train a machine learning model. In some instances, this may be accomplished by compressing the data (e.g., to roughly 1/10th of the size) and placing it in a common format that may be mixed and matched with other data sources to discriminate between "crime" and "no crime."

For example, one of the more robust sources of customer information (e.g., at an enterprise organization such as a financial institution) is the history of transactions on a particular customer's account across many channels (e.g., debit card, credit card, automated clearing house (ACH) transfers, wire transfers, or the like) offered as individual services. One challenge with leveraging this information to identify financial crime is that considering so many variables/features simultaneously over a long time horizon (e.g., years) may be impractical due to the amount of data involved. In some instances, aggregate level data for the various channels may be approximated, however, and this may result in an error prone analysis.

Such error prone analysis may result in cases being handed off to investigators that are false positives. Although investigators may ultimately identify the cases as false positive, this manual review may be expensive and inefficient.

Transactional history may be one of the largest sources of information reviewed by investigators deciding whether a particular financial crime has been committed. For example, investigators may determine that individuals around the country are depositing large sums into a particular account, and that a six figure wire transfer was subsequently made from the account to a watch list country. There may be a significant amount of data involved in transaction histories corresponding to a particular event, which may in some instances, span over a year with twenty or more different parties. Encoding these transactions using a neural network and then training a different neural network on the history of similar cases may result in an effective method for scoring potential criminal cases and identifying which cases should be filed as suspicious to the federal government and/or result in additional actions such as freezing or otherwise placing a hold on an account, or the like. In some instances, this approach may also allow for the flexibility of layering additional sources of information, for example, from a customer profile database, or the like.

Specifically, in some instances, compression of the different data sources (e.g., transactional history of a given party or customer) may be accomplished using vectorization. This is described herein with regard to the use of an auto encoder (e.g., variational, or the like), although a variety of other algorithms may similarly be applied. In some instances, features may be withheld from the variational auto encoder (e.g., to allow for independent adjustment, avoid signal degradation, or the like), and still contributed to a convolutional neural network (CNN). Additionally, in some instances, customer profile information may be vectorized in an unsupervised manner. It is important to note that, in some instances, the output vectors for the transaction history and the customer profile information may have different dimensions, sizes, or the like. After these vectors are generated, they may be combined (e.g., regardless of their respective sizes to one another) using the CNN, as is illustrated in method 205 of FIG. 2. In some instances, the CNN may incorporate labelled data for previously reviewed crimes.

Accordingly, by performing one or more of the methods described above, one or more of the systems described herein may achieve significantly smaller data sizes for the CNN. In some instances, this approach may result in data loss (e.g., lossy compression), but the benefits may be substantial enough to outweigh this concern. For example, the losses for transactional histories greater than twelve months may be on the order of 1%, which may be reasonable considering the real-world computational savings of this data compression. For algorithms like CNNs, additional data may result in both processing time and memory consumption of several orders of magnitude. Furthermore, one or more of the methods described herein may allow for incorporation of additional sources of information in the analysis. By extracting mathematical vector information from input data, data from various data sources may be combined in a robust manner.

Figure 1B:
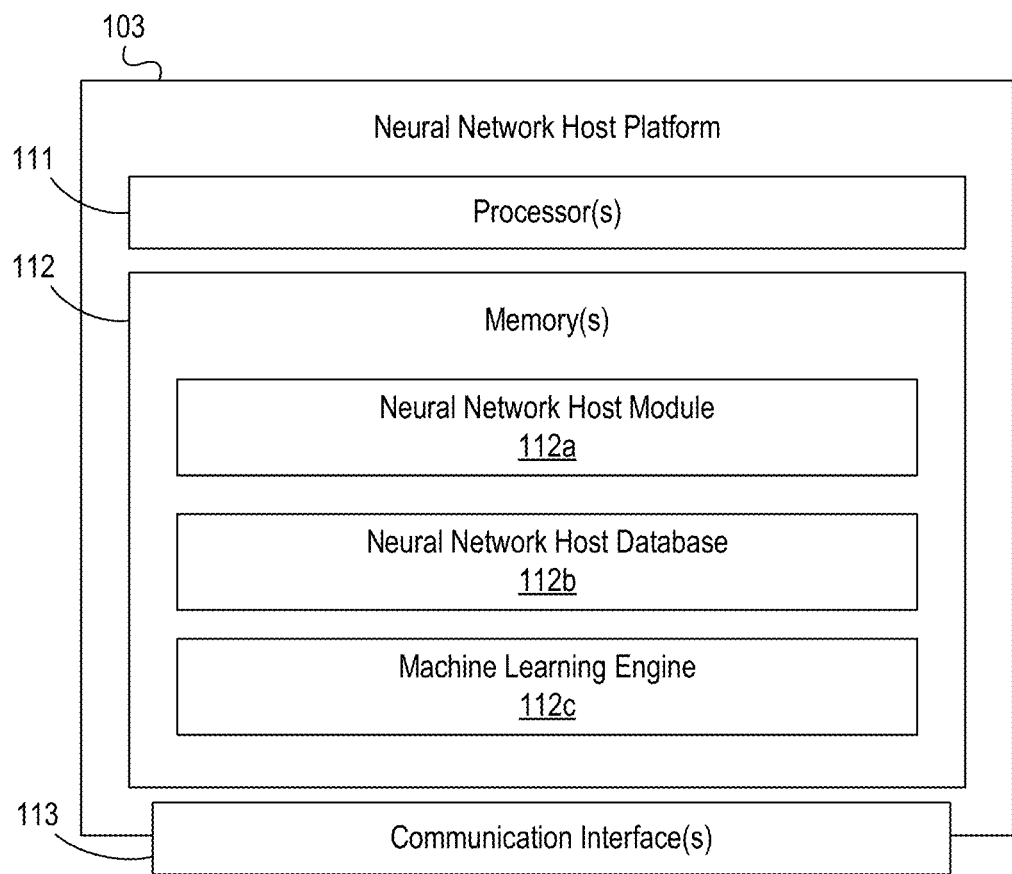

FIGS. 1A-1B depict an illustrative computing environment that implements machine learning techniques for generating automated suspicious activity reports in accordance with one or more example embodiments. Referring to FIG. 1A, computing environment 100 may include one or more computer systems. For example, computing environment 100 may include a transaction data storage system 102, neural network host platform 103, enterprise user device 104, and report processing system 105.

Transaction data storage system 102 may be a server, server blade, or the like configured to store data associated with an enterprise organization (e.g., transaction data for a financial institution, or the like). For example, transaction data storage system 102 may be configured to store debit card data, credit card data, automated clearing house (ACH) transfer data, wire transfer data, or the like. In some instances, transaction storage system 102 may be configured to communicate with neural network host platform 103 to share historical transaction data.

As described further below, neural network host platform 103 may be a computer system that includes one or more computing devices (e.g., servers, server blades, or the like) and/or other computer components (e.g., processors, memories, communication interfaces) that may be used to compress data (e.g., transaction data, customer profile data, reporting data, or the like) and/or implement machine learning models to identify suspicious transactions and cause automated report generation. In some instances, the neural network host platform 103 may be configured to maintain a machine learning model that may include historical transaction data that is labelled based on whether or not each data point was previously associated with a suspicious transaction. In some instances, neural network host platform 103 may be configured to dynamically adjust or otherwise update the machine learning model based on feedback and/or additional information.

Enterprise user device 104 may be a mobile device, tablet, smartphone, desktop computer, laptop computer, or the like, that may be used by an individual to perform tasks for an enterprise organization. In some instances, the enterprise user device 104 may be used by an employee of an enterprise organization to perform one or more tasks related to identification of suspicious activities, report generation, or the like. In some instances, the enterprise user device 104 may be configured to display transaction data (e.g., in response to one or more commands from the neural network host platform 103). For illustrative purposes, enterprise user device 104 is described throughout the following event sequence with regard to performing suspicious activity identification.

Report processing system 105 may be a server, server blade, or the like configured generate suspicious activity reports (SARs). For example, the report processing system 105 may be configured to receive one or more commands directing the report processing system 105 to generate the SAR from the neural network host platform 103, the enterprise user device 104, or the like. In some instances, the report processing system 105 may be configured to send the SAR to one or more computing devices corresponding to a law enforcement agency, financial institution, or the like.

Computing environment 100 also may include one or more networks, which may interconnect transaction data storage system 102, neural network host platform 103, enterprise user device 104, report processing system 105, or the like. For example, computing environment 100 may include a network 101 (which may interconnect, e.g., transaction data storage system 102, neural network host platform 103, enterprise user device 104, report processing system 105, or the like).

In one or more arrangements, transaction data storage system 102, neural network host platform 103, enterprise user device 104, and/or report processing system 105 may be any type of computing device capable of sending and/or receiving requests and processing the requests accordingly. For example, transaction data storage system 102, neural network host platform 103, enterprise user device 104, report processing system 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of transaction data storage system 102, neural network host platform 103, enterprise user device 104, and/or report processing system 105 may, in some instances, be special-purpose computing devices configured to perform specific functions.

Referring to FIG. 1B, neural network host platform 103 may include one or more processors 111, memory 112, and communication interface 113. A data bus may interconnect processor 111, memory 112, and communication interface 113. Communication interface 113 may be a network interface configured to support communication between neural network host platform 103 and one or more networks (e.g., network 101, or the like). Memory 112 may include one or more program modules having instructions that when executed by processor 111 cause neural network host platform 103 to perform one or more functions described herein and/or one or more databases that may store and/or otherwise maintain information which may be used by such program modules and/or processor 111. In some instances, the one or more program modules and/or databases may be stored by and/or maintained in different memory units of neural network host platform 103 and/or by different computing devices that may form and/or otherwise make up neural network host platform 103. For example, memory 112 may have, host, store, and/or include neural network host module 112a, neural network host database 112b, and a machine learning engine 112c.

Neural network host module 112a may have instructions that direct and/or cause neural network host platform 103 to execute advanced data compression and machine learning techniques related to suspicious activity identification and automated report generation, as discussed in greater detail below. Neural network host database 112b may store information used by neural network host module 112a and/or neural network host platform 103 in application of machine learning techniques related to suspicious activity identification and automated report generation, and/or in performing other functions. Machine learning engine 112c may have instructions that direct and/or cause the neural network host platform 103 to set, define, and/or iteratively refine optimization rules and/or other parameters used by the neural network host platform 103 and/or other systems in computing environment 100.

Figure 3A:
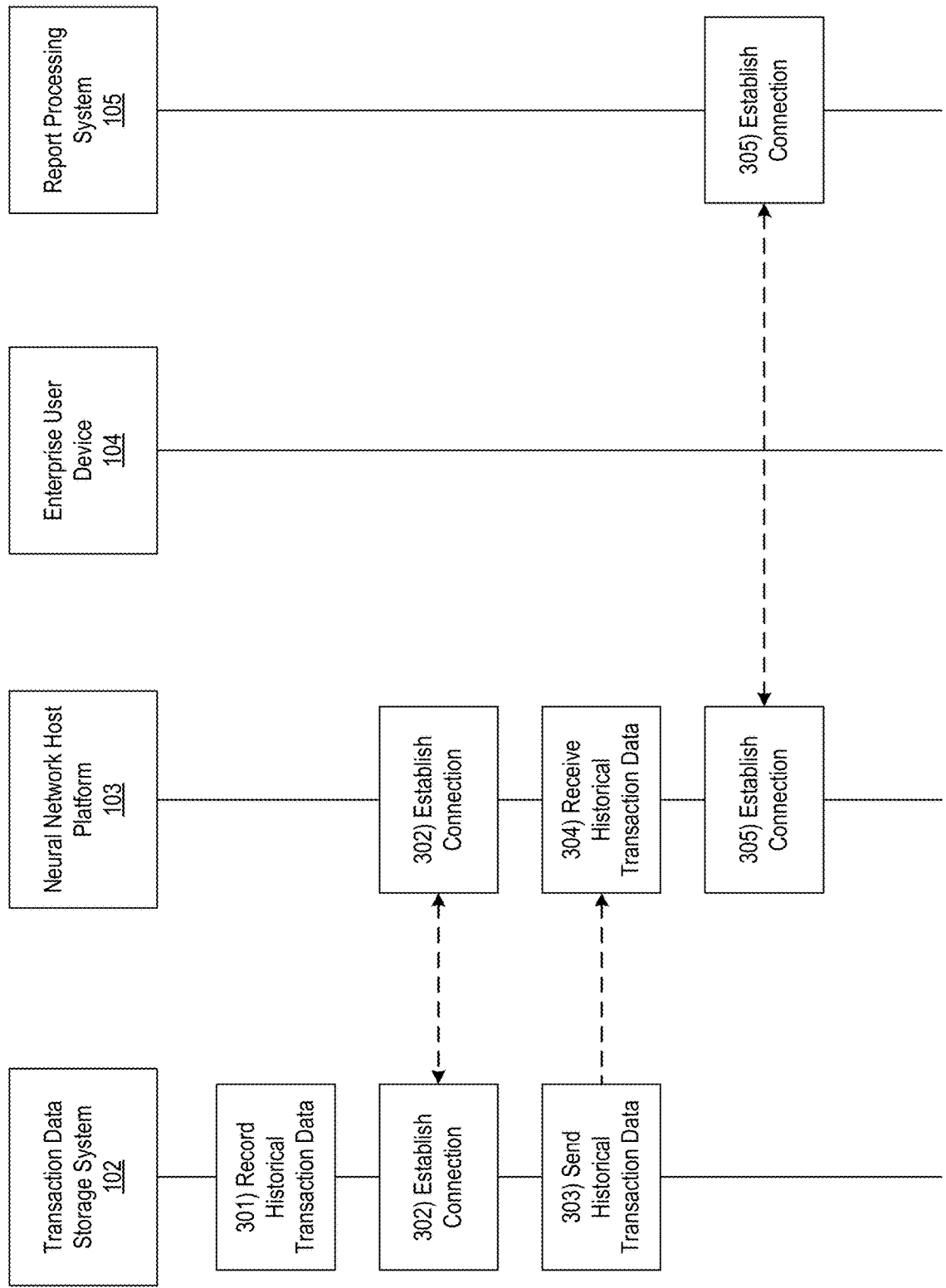

FIGS. 3A-3G depict an illustrative event sequence that implements machine learning techniques for generating automated suspicious activity reports in accordance with one or more example embodiments. Referring to FIG. 3A, at step 301, transaction data storage system 102 may record historical transaction data. For example, the transaction data storage system 102 may record historical debit card data, credit card data, automated clearing house (ACH) transfer data, wire transfer data, deposit amounts, frequency of deposits, identities of depositors, identities of individuals related to the depositors, location of deposits, account information, locations of institutions corresponding to the account information, or wire transfer frequency, or the like corresponding to historical transactions. In some instances, the transaction data storage system 102 may store the historical transaction data for a predetermined period of time (e.g., 1 year, 5 years, 10 years, or the like) and may then delete the historical transaction data.

At step 302, transaction data storage system 102 may establish a connection with neural network host platform 103. For example, the transaction data storage system 102 may establish a first wireless data connection with the neural network host platform 103 to link the transaction data storage system 102 to the neural network host platform 103 (e.g., in preparation for sending the historical transaction data). In some instances, the transaction data storage system 102 may determine whether or not a connection is already established with the neural network host platform 103. If a connection is already established, the transaction data storage system 102 might not re-establish the connection. If a connection is not already established, the transaction data storage system 102 may establish the first wireless data connection as described herein.

At step 303, the transaction data storage system 102 may send the historical transaction data to the neural network host platform 103. In some instances, the transaction data storage system 102 may send the historical transaction data to the neural network host platform 103 at a predetermined interval (e.g., once a day, once a week, or the like). In other instances, the transaction data storage system 102 may sync with the neural network host platform 103 to provide the historical transaction data to the neural network host platform 103 as it is recorded. In some instances, the transaction data storage system 102 may send the historical transaction data to the neural network host platform 103 while the first wireless data connection is established.

At step 304, the neural network host platform 103 may receive the historical transaction data sent at step 303. In some instances, the neural network host platform 103 may receive the historical transaction data via the communication interface 113 and while the first wireless data connection is established.

At step 305, the report processing system 105 may establish a connection with neural network host platform 103. For example, the report processing system 105 may establish a second wireless data connection with the neural network host platform 103 to link the report processing system 105 to the neural network host platform (e.g., in preparation for sending historical report information). In some instances, the report processing system 105 may identify whether a connection is already established with the neural network host platform 103. If a connection is already established with the neural network host platform 103, the report processing system 105 might not re-establish the connection. If a connection is not yet established with the neural network host platform 103, the report processing system 105 may establish the second wireless data connection as described herein.

Referring to FIG. 3B, at step 306, the report processing system 105 may send historical report information to the neural network host platform 103. For example, the report processing system 105 may send information included in historical suspicious activity reports that were generated based on the historical transaction data. In some instances, in sending the historical report information, the report processing system 105 may send one or more of: a name, an address, a social security number, a tax identifier, a birth date, a driver's license number, a passport number, an occupation of an involved party, a phone number, a date range, a suspicious activity code, a financial institution where the suspicious activity occurred, contact information for the financial institution, contact information for a law enforcement agency, a written description of the suspicious activity, or the like. In one or more instances, the report processing system 105 may send the historical report information to the neural network host platform 103 while the second wireless data connection is established.

At step 307, the neural network host platform 103 may receive the historical report information sent at step 306. In some instances, the neural network host platform 103 may receive the historical report information via the communication interface 113 and while the second wireless data connection is established.

At step 308, the neural network host platform 103 may generate a labelled dataset by combining the historical transaction data receive at step 304 and the historical report information received at step 307. For example, the neural network host platform 103 may identify correlations between the historical report information and the historical transaction data, and may store these correlations to generate a labelled dataset indicating whether or not a SAR was ultimately generated for each piece of the historical transaction data.

At step 309, the neural network host platform 103 may feed the labelled dataset into a convolutional neural network (CNN) hosted by the neural network host platform 103. For example, the neural network host platform 103 may feed the labelled dataset into the CNN for the purpose of establishing a machine learning dataset that may be used to analyze future transaction data using supervised learning. In some instances, the neural network host platform 103 may compress the labelled dataset prior to feeding it into the CNN (e.g., using an auto encoder and lossy compression as described below with regard to step 313 and further illustrated in FIG. 2). In other instances, the neural network host platform 103 might not compress the labelled dataset, but rather may store the labelled dataset as originally generated.

At step 310, the transaction data storage system 102 may record new transaction data. In some instances, in recording the new transaction data, the transaction data storage system 102 may record similar data to that described above at step 301 with regard to the historical transaction data. For example, the transaction data storage system 102 may record one or more of: debit card data, credit card data, automated clearing house (ACH) transfer data, wire transfer data, deposit amounts, frequency of deposits, identities of depositors, identities of individuals related to the depositors, location of deposits, account information, locations of institutions corresponding to the account information, or wire transfer frequency, or the like corresponding to a transactions corresponding to an event (e.g., a potential money laundering event, or the like). In these instances, the transaction data storage system 102 may record transaction data corresponding to an event that occurred after recordation of the historical transaction data at step 301.

Figure 3C:
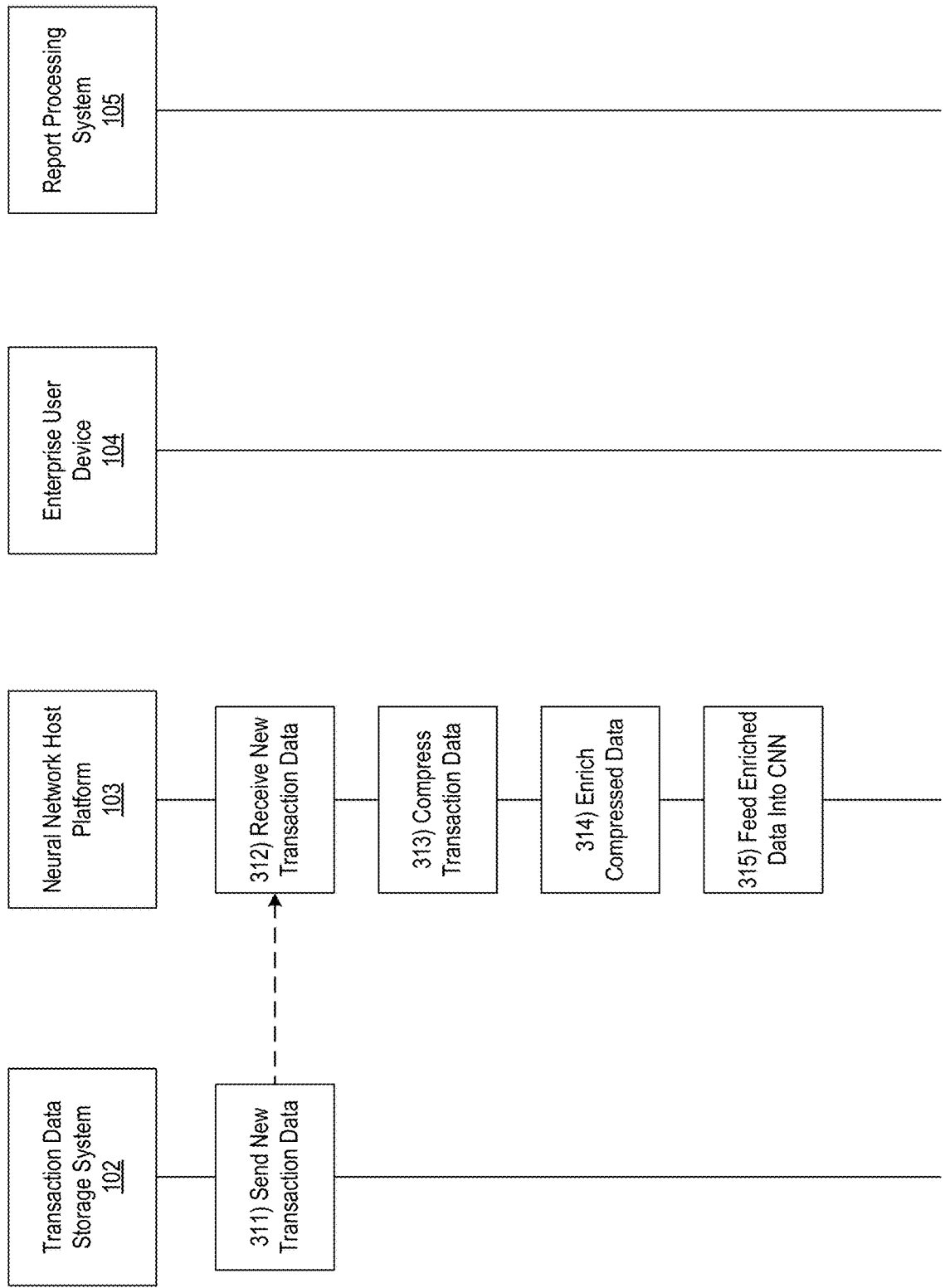

Referring to FIG. 3C, at step 311, the transaction data storage system 102 may send the new transaction data to the neural network host platform 103. In some instances, the transaction data storage system 102 may send the new transaction data to the neural network host platform 103 while the first wireless data connection is established.

At step 312, the neural network host platform 103 may receive the new transaction data sent at step 311. In some instances, the neural network host platform 103 may receive the new transaction data via the communication interface 113 and while the first wireless data connection is established.

Figure 2:
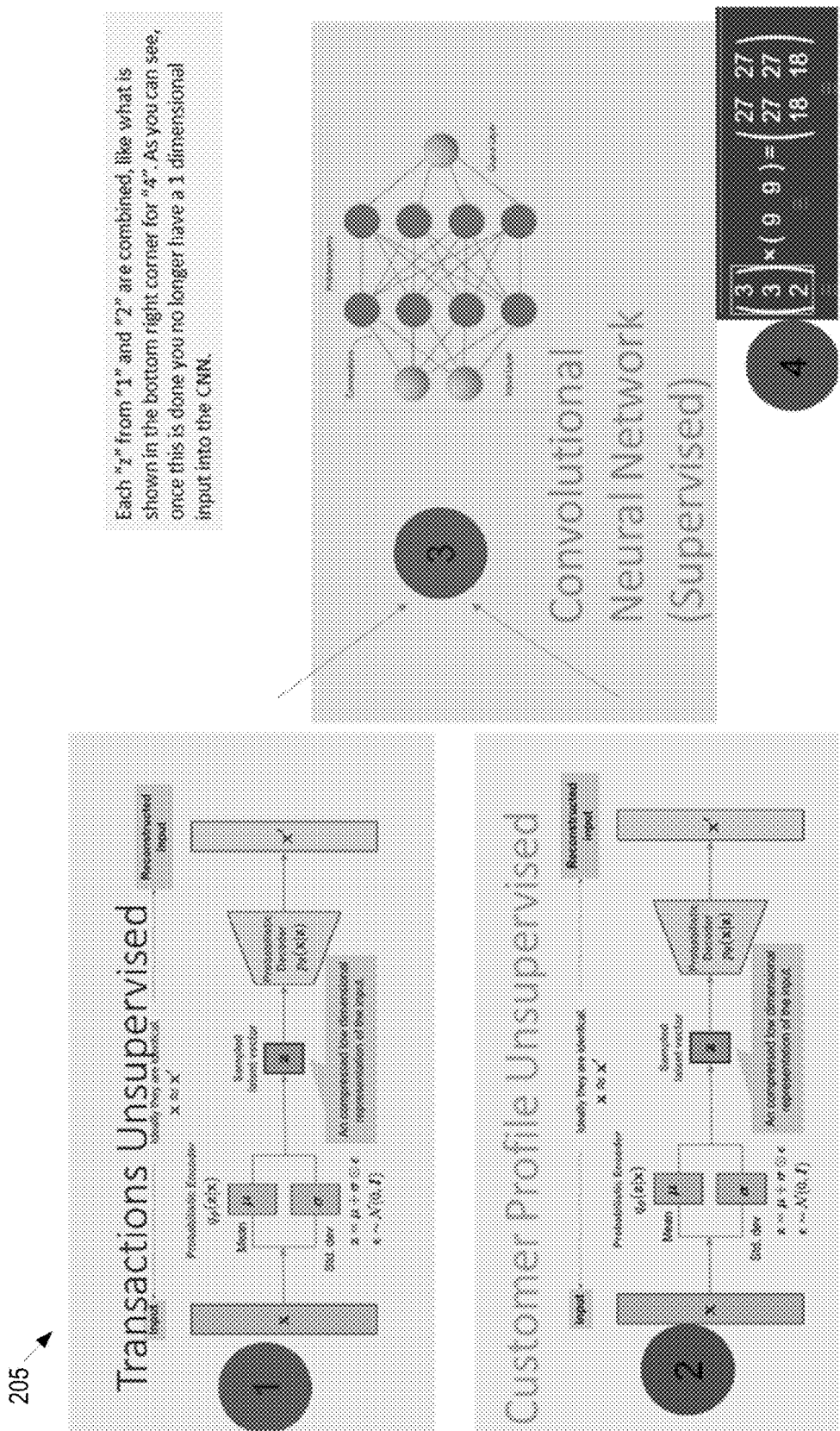
FIG. 2 depicts an illustrative method for implementing machine learning techniques for generating automated suspicious activity reports in accordance with one or more example embodiments.

At step 313, the neural network host platform 103 may compress the new transaction data. For example, the neural network host platform 103 may use an auto encoder (e.g., a variational auto encoder, or the like) to apply one or more lossy compression techniques to the new transaction data. In some instances, in compressing the new transaction data, the neural network host platform 103 may generate one or more numeric vectors representative of the new transaction data. In these instances, the neural network host platform 103 may compute a mean and/or standard deviation of the one or more numeric vectors representative of the new transaction data. Subsequently, in these instances, the neural network host platform 103 may sample the one or more numeric vectors representative of the new transaction data by randomly selecting a subset of the data included in the one or more numeric vectors representative of the new transaction data. The neural network host platform 103 may then compute a mean and/or standard deviation of the sampled numeric vector, and may compare these values to the mean and/or standard deviation of the one or more numeric vectors representative of the new transaction data. If the difference is greater than a predetermined threshold, the neural network host platform 103 may continue to add additional data from the one or more numeric vectors representative of the new transaction data until the difference is less than the predetermined threshold. If the difference is less than the predetermined threshold, the neural network host platform 103 may continue to step 314. This compression is further illustrated in the "transactions unsupervised" portion of the method 205, which is shown in FIG. 2.

By compressing the transaction data in this way, the neural network host platform 103 may achieve significantly smaller data sizes. Although this method may result in some data loss, this may be on the order of merely 1% for transactional histories going back greater than twelve months. Furthermore, such smaller data sizes may result in significant computations savings for the neural network host platform 103, specifically with regard to implementation of the CNN, which may have limitations in both processing time and memory consumption of several orders of magnitude, and furthermore may have difficulty processing categorical data (e.g., binary decisions, or the like). Rather, to achieve the benefits of CNN analysis, the data should be specifically formatted as an input (e.g., similar to red-green-blue (RGB) for images, or the like). On this note, it may be important to apply CNN analysis due to the substantial amount of data involved (e.g., it may be difficult to analyze the transaction data without applying deep learning). Accordingly, by compressing the transaction data using lossy compression, the neural network host platform 103 may achieve the benefits of CNN analysis, which might not otherwise be available due to the substantial amount of data involved.

In some instances, certain portions of the new transaction data might not be compressed as described herein (e.g., to allow for independent adjustment, prevent degradation of signal, or the like). In these instances, these portions of the new transaction data might not be compressed, but may nevertheless be fed into the CNN as described below at step 315.

At step 314, the neural network host platform 103 may enrich the compressed transaction data. For example, the neural network host platform 103 may receive or otherwise have access to additional data such as customer profile data, social media data, law enforcement records, or the like. In these instances, the neural network host platform 103 may use the auto encoder (e.g., a variational auto encoder) to apply one or more lossy compression techniques to the additional data (e.g., as described above at step 313 with regard to compression of the new transaction data). In some instances, the compressed additional data may have a different size and/or dimensions (e.g., vector dimensions) than the compressed transaction data. After compressing the additional data, the neural network host platform 103 may enrich the compressed transaction data by combining the vector results corresponding to the compressed additional data and the compressed transaction data. For example, the compressed transaction data may be a vector $$\begin{pmatrix} 3 \\ 2 \\ 2 \end{pmatrix}$$

and the compressed additional data may be a vector (9 9) (as is shown in element 4 of the method 205, which is illustrated in FIG. 2. The neural network host platform 103 may combine these vectors by multiplying them together, resulting in enriched compressed transaction data $$\left(\text{e.g.,}\begin{pmatrix} 3 \\ 2 \\ 2 \end{pmatrix} \times (9\ 9) = \begin{pmatrix} 27 & 27 \\ 27 & 27 \\ 18 & 18 \end{pmatrix}\right).$$

In doing so, the neural network host platform 103 may combine data from a number of different sources regardless of their dimensions/sizes. In some instances, the neural network host platform 103 might not enrich the compressed transaction data.

In these instances, the neural network host platform 103 may skip step 314. In some instances, certain portions of the additional data might not be compressed as described herein (e.g., to allow for independent adjustment, prevent degradation of signal, or the like). In these instances, these portions of the additional data might not be compressed, but may nevertheless be fed into the CNN as described below at step 315.

At step 315, the neural network host platform 103 may feed the enriched compressed transaction data into the CNN. For example, the neural network host platform 103 may feed the enriched compressed transaction data into the CNN for the purpose of using machine learning to identify whether or not the enriched compressed transaction data corresponds to a suspicious activity and/or whether or not a SAR should be generated accordingly.

Figure 3D:
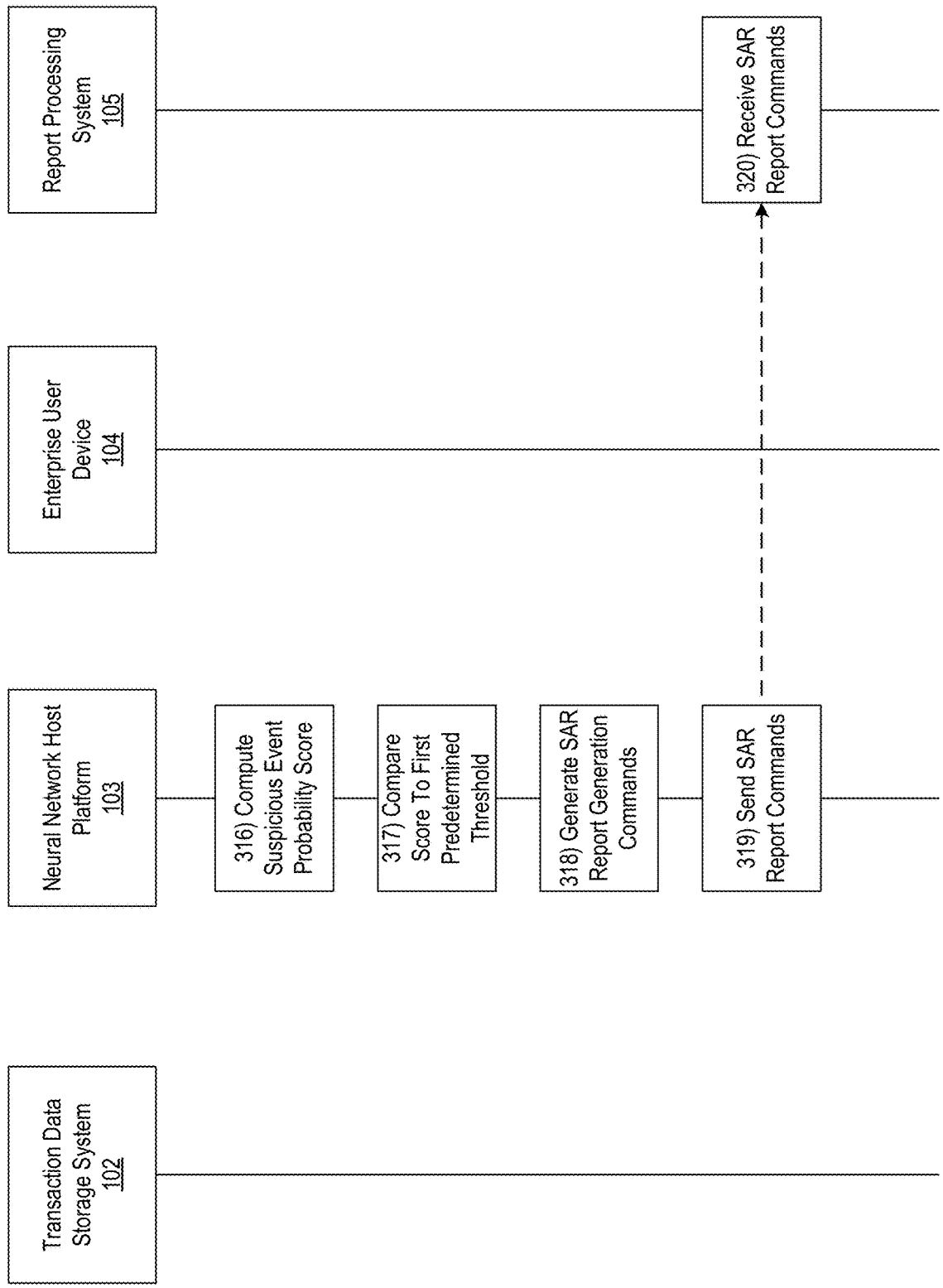

Referring to FIG. 3D, at step 316, the neural network host platform 103 may compute a suspicious event probability score using the CNN. For example, the neural network host platform 103 may apply one or more machine learning algorithms to compare the compressed transaction data (e.g., which may be the enriched compressed transaction data) to the labelled dataset fed into the CNN at step 309. For example, the neural network host platform 103 may identify matches (e.g., exact matches, fuzzy matches, or the like) between the new transaction data and the historical transaction data. In doing so, the neural network host platform 103 may identify whether the matches correspond to historical transaction data labelled with historical report information. In these instances, the neural network host platform 103 may compute a higher score as additional corresponding historical report information is identified, and a lower score as less corresponding historical report information is identified. In some instances, in computing the suspicious event probability score, the neural network host platform 103 may compute a numeric value between 0 and 100, with 0 being the least likely that a report should be generated and 100 being the most likely. Accordingly, as a result of being fed compressed transaction data, the CNN may output the suspicious event probability score.

Additionally or alternatively, in generating the suspicious event probability score, the neural network host platform 103 may compute an output vector that includes a probability that the new transaction data corresponds to each of a plurality of money laundering crimes (e.g., wire fraud, large cash deposits, funneling, or the like). In these instances, the neural network host platform 103 may subsequently compare each of these probabilities to the various thresholds described below, and may determine that the given threshold is exceeded if at least one of the probabilities exceeds the threshold (e.g., if the wire fraud probability exceeds a threshold, but cash deposit/funneling probabilities do not, the neural network host platform 103 may nevertheless determine that the threshold is exceeded).

At step 317, the neural network host platform 103 may compare the suspicious event probability score to a first predetermined threshold. For example, the neural network host platform 103 may set a first predetermined threshold of 75. If the neural network host platform 103 determines that the suspicious event probability score exceeds the first predetermined threshold, the neural network host platform 103 may proceed to step 318. If the neural network host platform 103 determines that the suspicious event probability score does not exceed the first predetermined threshold, the neural network host platform 103 may proceed to step 323.

In some instances, the neural network host platform 103 may dynamically adjust the first predetermined threshold using machine learning. For example, the neural network host platform 103 may have a target percentage for a number of suspicious event probability scores that should exceed the first predetermined threshold (e.g., 15%, or the like). In this example, if the neural network host platform 103 determines that 25% of the suspicious event probability scores are exceeding the first predetermined threshold, the neural network host platform 103 may increase the first predetermined threshold. In contrast, if 10% of suspicious event probability scores exceed the first predetermined threshold, the neural network host platform 103 may decrease the first predetermined threshold.

At step 318, the neural network host platform 103 may generate one or more commands directing the report processing system 105 to generate a SAR report. In some instances, the neural network host platform 103 may generate the one or more commands directing the report processing system 105 to generate the SAR report based on or in response to the determination at step 317 that the suspicious event probability score exceeds the first predetermined threshold.

At step 319, the neural network host platform 103 may send the one or more commands directing the report processing system 105 to generate a SAR report. In some instances, the neural network host platform 103 may send the one or more commands directing the report processing system 105 to generate the SAR report via the communication interface 113 and while the second wireless data connection is established.

At step 320, the report processing system 105 may receive the one or more commands directing the report processing system 105 to generate the SAR report. In some instances, the report processing system 105 may receive the one or more commands directing the report processing system 105 to generate the SAR report while the second wireless data connection is established.

Referring to FIG. 3E, at step 321, the report processing system 105 may generate the SAR report corresponding to the new transaction data. For example, the report processing system 105 may generate a report including one or more of: a name, an address, a social security number, a tax identifier, a birth date, a driver's license number, a passport number, an occupation of an involved party, a phone number, a date range, a suspicious activity code, a financial institution where the suspicious activity occurred, contact information for the financial institution, contact information for a law enforcement agency, a written description of the suspicious activity, or the like relating to the new transaction data. In some instances, the report processing system 105 may send this report to a law enforcement agency, financial institution, or the like for further investigation. In some instances, the report processing system 105 may generate the SAR based on or in response to receiving the one or more commands directing the report processing system 105 to generate the SAR report. In some instances, the report processing system 105 may automatically generate the SAR report without additional manual input. After generation of the SAR report at step 321, the event sequence may proceed to step 333.

At step 322, the neural network host platform 103 may compare the suspicious event probability score to a second predetermined threshold, lower than the first predetermined threshold. For example, the neural network host platform 103 may set a second predetermined threshold of 50. If the neural network host platform 103 determines that the suspicious event probability score exceeds the second predetermined threshold, but not the first predetermined threshold, the neural network host platform 103 may proceed to step 323. If the neural network host platform 103 determines that the suspicious event probability score does not exceed the second predetermined threshold, the neural network host platform 103 may proceed to step 333.

At step 323, the neural network host platform 103 may generate one or more commands directing the enterprise user device 104 to display a transaction review interface (e.g., an interface that may allow an employee of a financial institution to manually review the new transaction data). In one or more instances, the neural network host platform 103 may generate the transaction review interface. In other instances, the neural network host platform 103 may generate transaction review interface information that may be used by the enterprise user device 104 to generate the transaction review interface.

At step 324, the neural network host platform 103 may establish a connection with the enterprise user device 104. In some instances, the neural network host platform 103 may establish a third wireless data connection with the enterprise user device 104 to link the neural network host platform 103 to the enterprise user device 104 (e.g., in preparation for sending the one or more commands directing the enterprise user device 104 to display a transaction review interface). In some instances, the neural network host platform 103 may identify whether a connection is already established with the enterprise user device 104. If a connection is already established with the enterprise user device 104, the neural network host platform 103 might not re-establish the connection. If a connection is not yet established with the enterprise user device 104, the neural network host platform 103 may establish the third wireless data connection as described herein.

Figure 3F:
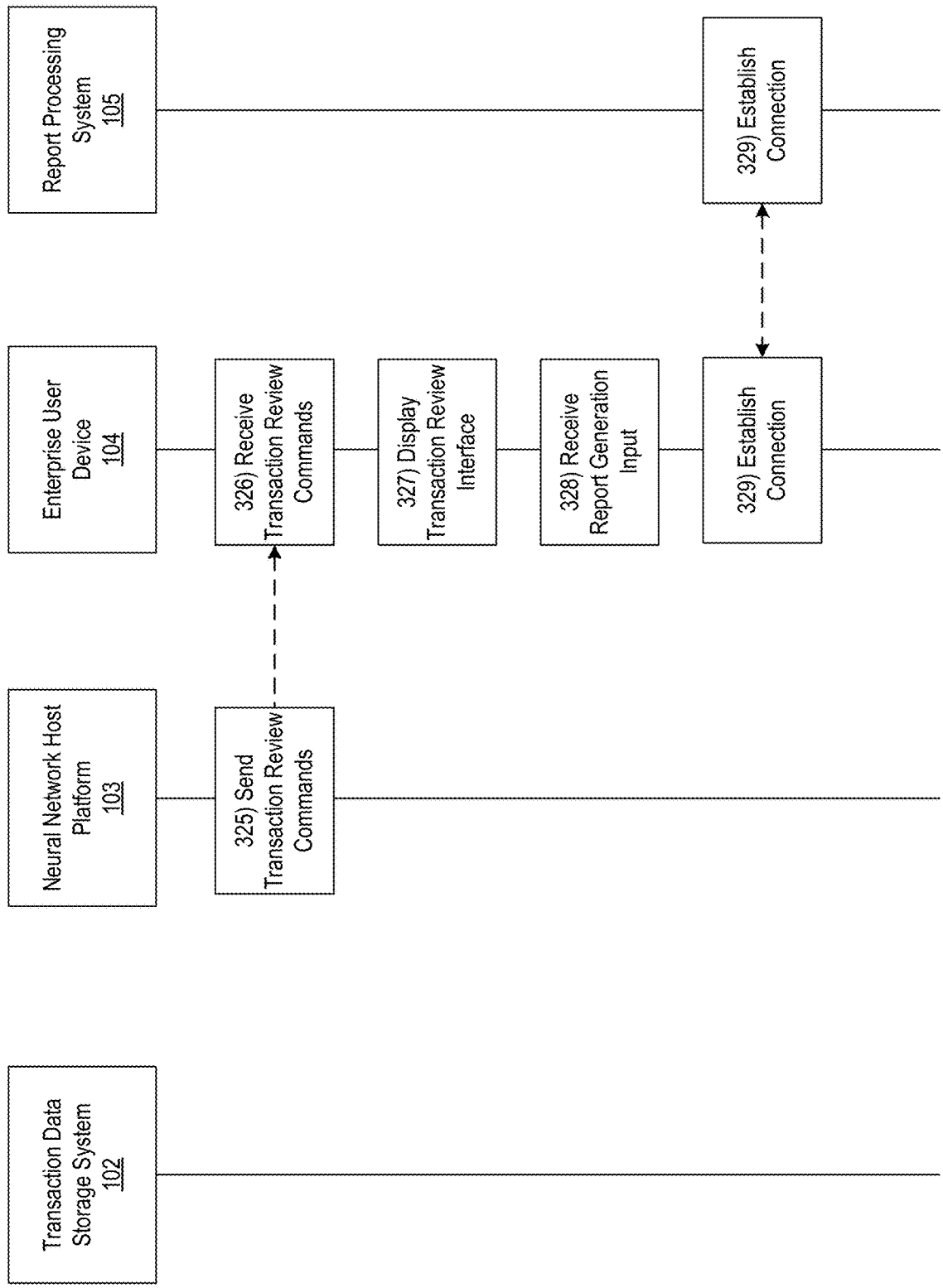

Referring to FIG. 3F, at step 325, the neural network host platform 103 may send the one or more commands directing the enterprise user device 104 to display a transaction review interface. In some instances, the neural network host platform 103 may send the one or more commands directing the enterprise user device 104 to display the transaction review interface via the communication interface 113 and while the third wireless data connection is established. In some instances, the neural network host platform 103 may also send the transaction review interface or transaction review interface information to the enterprise user device 104.

At step 326, the enterprise user device 104 may receive the one or more commands directing the enterprise user device 104 to display the transaction review interface. In one or more instances, the neural network host platform 103 may receive the one or more commands directing the enterprise user device 104 to display the transaction review interface while the third wireless data connection is established. In some instances, the enterprise user device 104 may also receive the transaction review interface or transaction review interface information from the neural network host platform 103.

At step 327, the enterprise user device 104 may display the transaction review interface. For example, the enterprise user device 104 may display a graphical user interface similar to graphical user interface 505, which is illustrated in FIG. 5. In some instances, the enterprise user device 104 may display the new transaction data, along with options to generate or not generate a SAR report. In some instances, the enterprise user device 104 may display a graphical user interface received from the neural network host platform 103. In other instances, the enterprise user device 104 may generate the graphical user interface based on transaction review interface information received from the neural network host platform 103. In some instances, the enterprise user device 104 may display the transaction review interface based on or in response to the one or more commands directing the enterprise user device 104 to display the transaction review interface.

At step 328, the enterprise user device 104 may receive a report generation input (e.g., from an employee of an enterprise organization such as a financial institution). In some instances, the enterprise user device 104 may receive the report generation input via a display of the enterprise user device 104. If the enterprise user device 104 receives a report generation input indicating that a report should be generated, the enterprise user device 104 may proceed to step 329. If the enterprise user device 104 receives a report generation input indicating that a report should not be generated, the event sequence may proceed to step 333.

At step 329, the enterprise user device 104 may establish a connection with the report processing system 105. For example, the enterprise user device 104 may establish a fourth wireless data connection with the report processing system 105 to link the enterprise user device 104 to the report processing system 105 (e.g., in preparation for sending a report generation request). In some instances, the enterprise user device 104 may identify whether a connection is already established with the report processing system 105. If a connection is already established with the report processing system 105, the enterprise user device 104 might not re-establish the connection. If a connection is not already established with the report processing system 105, the enterprise user device 104 may establish the fourth wireless data connection as described herein.

Figure 3G:
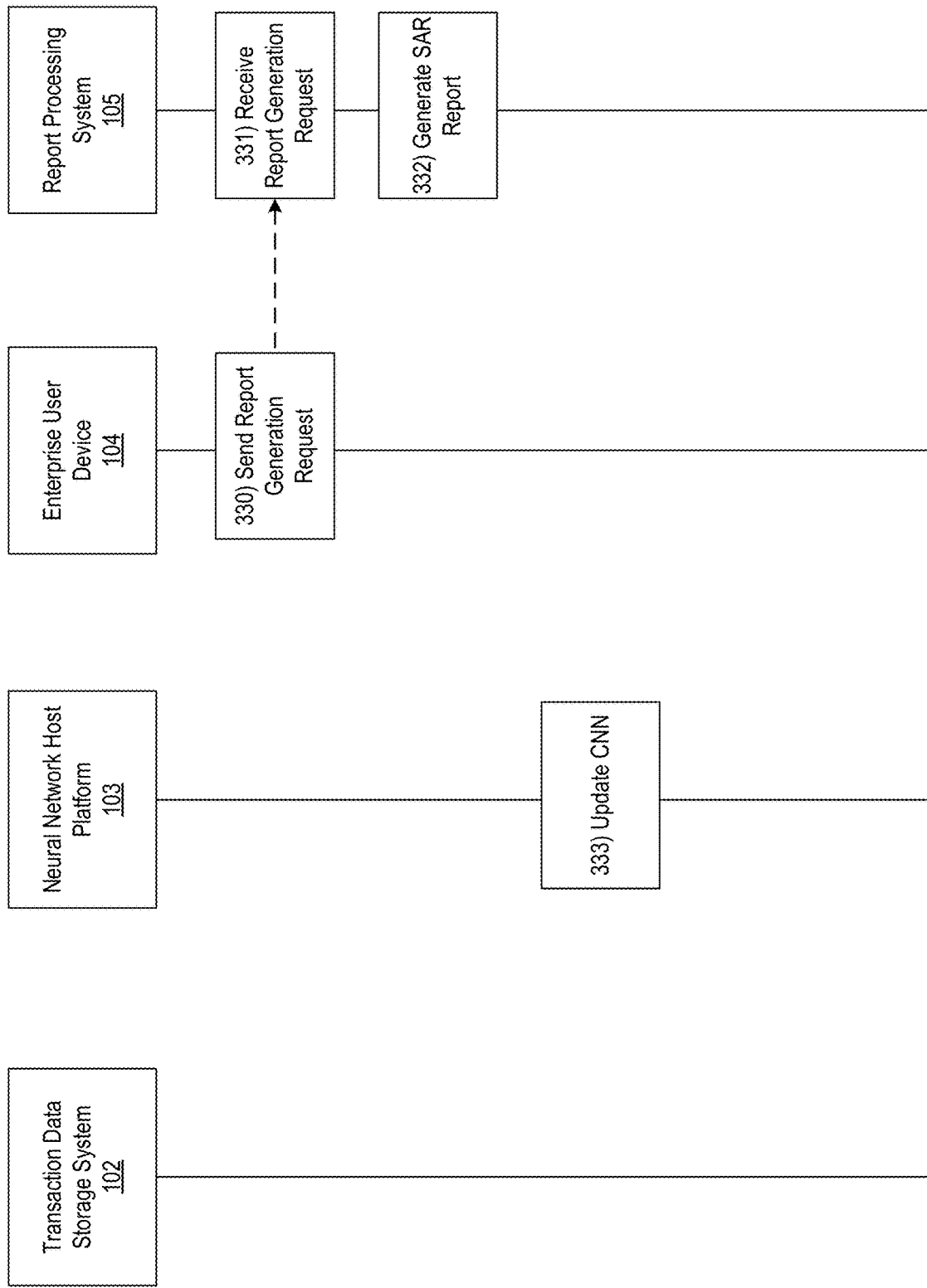

Referring to FIG. 3G, at step 330, the enterprise user device 104 may send a report generation request to the report processing system 105. In some instances, the enterprise user device 104 may send the report generation request to the report processing system 105 while the fourth wireless data connection is established.

At step 331, the report processing system 105 may receive the report generation request sent at step 330. In some instances, the report processing system 105 may receive the report generation request while the fourth wireless data connection is established.

At step 332, the report processing system 105 ay generate the SAR report based on the report generation request received at step 331. In generating the SAR report, the report processing system 105 may perform similar actions to those described above with regard to step 321.

At step 333, the neural network host platform 103 may update the CNN based on whether or not a SAR report was generated based on the new transaction data. For example, the neural network host platform 103 may receive report information from the report processing system 105 (e.g., as described above at step 307), label the new transaction data (e.g., as described above at step 308), and incorporate the labelled new transaction data into the CNN to update the labelled dataset. In doing so, the neural network host platform 103 may continuously and dynamically improve in the identification of suspicious activities.

Although the event sequence described herein primarily refers to distinguishing "crime" and "no crime" acts based on transaction data, other insights may be made based on other types of data using similar methods without departing from the scope of this disclosure.

Figure 4:
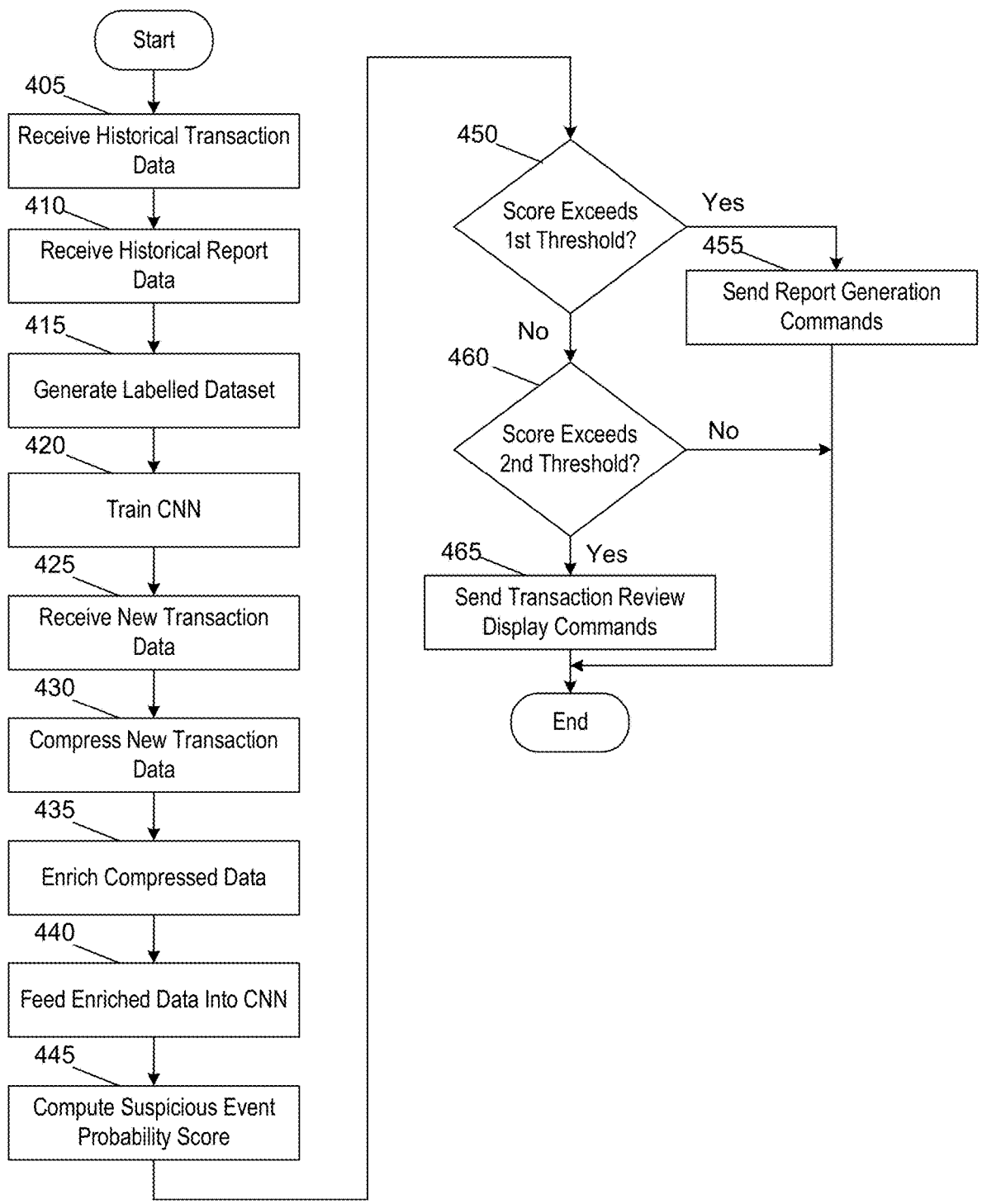
FIG. 4 depicts an illustrative method for implementing machine learning techniques for generating automated suspicious activity reports in accordance with one or more example embodiments.

FIG. 4 depicts an illustrative method for implementing machine learning techniques for generating automated suspicious activity reports in accordance with one or more example embodiments. Referring to FIG. 4, at step 405, a computing platform having at least one processor, a communication interface, and memory may receive historical transaction data. At step 410, the computing platform may receive historical report data. At step 415, the computing platform may generate a labelled dataset using the historical transaction data and the historical report data. At step 420, the computing platform may train a convolutional neural network (CNN) using the labelled dataset. At step 425, the computing platform may receive new transaction data. At step 430, the computing platform may compress the new transaction data. At step 435, the computing platform may enrich the compressed transaction data. At step 440, the computing platform may feed the enriched compressed transaction data into the CNN. At step 445, the computing platform may compute a suspicious event probability score. At step 450, the computing platform may determine whether the suspicious event probability score exceeds a first predetermined threshold. If the suspicious event probability score exceeds the first predetermined threshold, the computing platform may proceed to step 455. At step 455, the computing platform may send one or more report generation commands to a report processing system.

Returning to step 450, if the suspicious event probability score does not exceed the first predetermined threshold, the computing platform may proceed to step 460. At step 460, the computing platform may determine whether the suspicious event probability score exceeds a second predetermined threshold. If the suspicious event probability score does not exceed the second predetermined threshold, the method may end. If the suspicious event probability score does exceed the second predetermined threshold, the computing platform may proceed to step 465. At step 465, the computing platform may send one or more transaction review display commands to an enterprise user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   train a convolutional neural network using a labelled transaction history dataset comprising combined historical transaction data and historical report information;
   receive, from a transaction data storage system, new transaction data;
   compress the new transaction data using at least one lossy compression method, wherein compressing the new transaction data using the at least one lossy compression method produces compressed transaction data, wherein compressing the new transaction data using the at least one lossy compression method comprises feeding the new transaction data into an auto encoder, wherein the auto encoder:
   generates one or more vector representations of the new transaction data;
   computes, using the one or more vector representations of the new transaction data, a mean value and a standard deviation representative of the one or more vector representations of the new transaction data;
   samples, in a random manner, the one or more vector representations of the new transaction data;
   computes, using the sampled one or more vector representations of the new transaction data, a mean value and a standard deviation representative of the sampled one or more vector representations of the new transaction data;
   determines whether a first difference between the mean value of the sampled one or more vector representations of the new transaction data and the mean value of the one or more vector representations of the new transaction data exceeds a first predetermined difference threshold and whether a second difference between the standard deviation of the sampled one or more vector representations of the new transaction data and the standard deviation of the one or more vector representations of the new transaction data exceeds a second predetermined difference threshold; and
   based on a determination that both: 1) the first difference does not exceed the first predetermined difference threshold, and 2) the second difference does not exceed the second predetermined difference threshold, outputs the compressed transaction data;
   input the compressed transaction data into the convolutional neural network, wherein inputting the compressed transaction data into the convolutional neural network causes the convolutional neural network to output produce a suspicious event probability score based on the compressed transaction data; and
   based on determining that the suspicious event probability score exceeds a first predetermined threshold, send one or more commands to a report processing system directing the report processing system to generate a suspicious activity report (SAR), wherein sending the one or more commands directing the report processing system to generate the SAR causes the report processing system to generate the SAR.

2. The computing platform of claim 1, wherein the historical transaction data comprises one or more of: deposit amounts, frequency of deposits, identities of depositors, identities of individuals related to the depositors, location of deposits, account information, locations of institutions corresponding to the account information, or wire transfer frequency corresponding to a plurality of historical transactions.

3. The computing platform of claim 1, wherein the historical report information indicates whether or not the SAR was generated based on the historical transaction data.

4. The computing platform of claim 1, wherein the new transaction data comprises one or more of: deposit amounts, frequency of deposits, identities of depositors, identities of individuals related to the depositors, location of deposits, account information, locations of institutions corresponding to the account information, or wire transfer frequency corresponding to a plurality of new transactions, wherein the new transaction data is generated after the historical transaction data.

5. The computing platform of claim 1, wherein the memory stores additional computer-readable instructions that, when executed by the at least one processor, further cause the computing platform to:
   determine whether the suspicious event probability score exceeds the first predetermined threshold.

6. The computing platform of claim 1, wherein the auto encoder is further configured to:
   based on a determination that one or more of: 1) the first difference does exceed the first predetermined difference threshold, or 2) the second difference exceeds the second predetermined difference threshold:
   integrate additional data from the one or more vector representations of the new transaction data into the sampled one or more vector representations of the new transaction data;
   re-compute the mean value and the standard deviation representative of the sampled one or more vector representations of the new transaction data; and
   determine whether the first difference between the mean value of the sampled one or more vector representations of the new transaction data and the mean value of the one or more vector representations of the new transaction data exceeds the first predetermined difference threshold and whether the second difference between the standard deviation of the sampled one or more vector representations of the new transaction data and the standard deviation of the one or more vector representations of the new transaction data exceeds a second predetermined difference threshold.

7. The computing platform of claim 6, wherein the auto encoder comprises a variational auto encoder.

8. The computing platform of claim 1, wherein the memory stores additional computer-readable instructions that, when executed by the at least one processor, further cause the computing platform to:

enrich, prior to inputting the compressed transaction data into the convolutional neural network, the compressed transaction data, wherein enriching the compressed transaction data comprises:
  receiving customer profile data corresponding to the new transaction data;
  compressing the customer profile data using the at least one lossy compression method; and
  combining the compressed customer profile data with the compressed transaction data.

9. The computing platform of claim 8, wherein enriching the compressed transaction data results in a multi-dimensional vector input for the convolutional neural network.

10. The computing platform of claim 8, wherein the customer profile data comprises one or more of: account information, contact information, social media information, or law enforcement requests.

11. The computing platform of claim 1, wherein the memory stores additional computer-readable instructions that, when executed by the at least one processor, further cause the computing platform to:
  based on determining that the suspicious event probability score does not exceed the first predetermined threshold, compare the suspicious event probability score to a second predetermined threshold;
  based on determining that the suspicious event probability score exceeds the second predetermined threshold, send one or more commands directing an enterprise user device to display a transaction review interface, wherein sending the one or more commands directing the enterprise user device to display the transaction review interface causes the enterprise user device to display the transaction review interface; and
  based on determining that the suspicious event probability score does not exceed the second predetermined threshold, determine that the new transaction data does not correspond to a suspicious event.

12. The computing platform of claim 11, wherein the memory stores additional computer-readable instructions that, when executed by the at least one processor, further cause the computing platform to:
  update, after determining whether or not the new transaction data corresponds to a suspicious event, the convolutional neural network to include additional labelled data representative of the new transaction data and whether or not a suspicious event was determined.

13. The computing platform of claim 11, wherein the suspicious event comprises one or more of: money laundering, wire fraud, a large cash deposit, or funneling.

14. A method comprising:
  at a computing platform comprising at least one processor, a communication interface, and memory:
    training a convolutional neural network using a labelled transaction history dataset comprising combined historical transaction data and historical report information;
    receiving, from a transaction data storage system, new transaction data;
    compressing the new transaction data using at least one lossy compression method, wherein compressing the new transaction data using the at least one lossy compression method produces compressed transaction data, wherein compressing the new transaction data using the at least one lossy compression method comprises feeding the new transaction data into an auto encoder, wherein the auto encoder:
      generates one or more vector representations of the new transaction data;
      computes, using the one or more vector representations of the new transaction data, a mean value and a standard deviation representative of the one or more vector representations of the new transaction data;
      samples, in a random manner, the one or more vector representations of the new transaction data;
      computes, using the sampled one or more vector representations of the new transaction data, a mean value and a standard deviation representative of the sampled one or more vector representations of the new transaction data;
      determines whether a first difference between the mean value of the sampled one or more vector representations of the new transaction data and the mean value of the one or more vector representations of the new transaction data exceeds a first predetermined difference threshold and whether a second difference between the standard deviation of the sampled one or more vector representations of the new transaction data and the standard deviation of the one or more vector representations of the new transaction data exceeds a second predetermined difference threshold; and
      based on a determination that both: 1) the first difference does not exceed the first predetermined difference threshold, and 2) the second difference does not exceed the second predetermined difference threshold, outputs the compressed transaction data; and
    inputting the compressed transaction data into the convolutional neural network, wherein inputting the compressed transaction data into the convolutional neural network causes the convolutional neural network to output produce a suspicious event probability score based on the compressed transaction data; and
    based on determining that the suspicious event probability score exceeds a first predetermined threshold, send one or more commands to a report processing system directing the report processing system to generate a suspicious activity report (SAR), wherein sending the one or more commands directing the report processing system to generate the SAR causes the report processing system to generate the SAR.

15. The method of claim 14, wherein the historical transaction data comprises one or more of: deposit amounts, frequency of deposits, identities of depositors, identities of individuals related to the depositors, location of deposits, account information, locations of institutions corresponding to the account information, or wire transfer frequency corresponding to a plurality of historical transactions.

16. The method of claim 14, wherein the historical report information indicates whether or not the SAR was generated based on the historical transaction data.

17. The method of claim 14, wherein the new transaction data comprises one or more of: deposit amounts, frequency of deposits, identities of depositors, identities of individuals related to the depositors, location of deposits, account information, locations of institutions corresponding to the account information, or wire transfer frequency corresponding to a plurality of new transactions, wherein the new transaction data is generated after the historical transaction data.

18. The method of claim 14, further comprising:
determining whether the suspicious event probability score exceeds the first predetermined threshold.

19. The method of claim 14, wherein the auto encoder is further configured to:
based on a determination that one or more of: 1) the first difference does exceed the first predetermined difference threshold, or 2) the second difference exceeds the second predetermined difference threshold:
integrate additional data from the one or more vector representations of the new transaction data into the sampled one or more vector representations of the new transaction data;
re-compute the mean value and the standard deviation representative of the sampled one or more vector representations of the new transaction data; and
determine whether the first difference between the mean value of the sampled one or more vector representations of the new transaction data and the mean value of the one or more vector representations of the new transaction data exceeds the first predetermined difference threshold and whether the second difference between the standard deviation of the sampled one or more vector representations of the new transaction data and the standard deviation of the one or more vector representations of the new transaction data exceeds a second predetermined difference threshold.

20. One or more non-transitory computer-readable media storing instructions that, when executed by a computing platform comprising at least one processor, a communication interface, and memory, cause the computing platform to:
train a convolutional neural network using a labelled transaction history dataset comprising combined historical transaction data and historical report information;
receive, from a transaction data storage system, new transaction data;
compress the new transaction data using at least one lossy compression method, wherein compressing the new transaction data using the at least one lossy compression method produces compressed transaction data, wherein compressing the new transaction data using the at least one lossy compression method comprises feeding the new transaction data into an auto encoder, wherein the auto encoder:
generates one or more vector representations of the new transaction data;
computes, using the one or more vector representations of the new transaction data, a mean value and a standard deviation representative of the one or more vector representations of the new transaction data;
samples, in a random manner, the one or more vector representations of the new transaction data;
computes, using the sampled one or more vector representations of the new transaction data, a mean value and a standard deviation representative of the sampled one or more vector representations of the new transaction data;
determines whether a first difference between the mean value of the sampled one or more vector representations of the new transaction data and the mean value of the one or more vector representations of the new transaction data exceeds a first predetermined difference threshold and whether a second difference between the standard deviation of the sampled one or more vector representations of the new transaction data and the standard deviation of the one or more vector representations of the new transaction data exceeds a second predetermined difference threshold; and
based on a determination that both: 1) the first difference does not exceed the first predetermined difference threshold, and 2) the second difference does not exceed the second predetermined difference threshold, outputs the compressed transaction data; and
input the compressed transaction data into the convolutional neural network, wherein inputting the compressed transaction data into the convolutional neural network causes the convolutional neural network to produce a suspicious event probability score based on the compressed transaction data; and
based on determining that the suspicious event probability score exceeds a first predetermined threshold, send one or more commands to a report processing system directing the report processing system to generate a suspicious activity report (SAR), wherein sending the one or more commands directing the report processing system to generate the SAR causes the report processing system to generate the SAR.

* * * * *